United States Patent [19]
Biggs

[11] Patent Number: 5,405,625
[45] Date of Patent: Apr. 11, 1995

[54] CHEESE-FILLED SNACK

[75] Inventor: Richard H. Biggs, Youngsville, N.Y.

[73] Assignee: Nabisco, Inc., Parsippany, N.J.

[21] Appl. No.: 96,627

[22] Filed: Jul. 21, 1993

[51] Int. Cl.$^6$ .............. A23C 19/09; A23L 1/217; A23P 1/08; A23P 1/12

[52] U.S. Cl. .................. 426/93; 426/283; 426/549

[58] Field of Search ............ 426/93, 549, 283

Primary Examiner—Donald E. Czaja
Assistant Examiner—Mary S. Mims

[57] ABSTRACT

Snacks with smooth, creamy cheese fillings contain pregelatinized rice flour in the filler and casing portions can be baked or microwaved. The cheese filling contains cheese and pregelatinized rice flour, and does not dry out or leak out on storage or heating. In preferred embodiments, pregelatinized rice flour comprises from about 5 to about 20% by weight of the filler portion. Some embodiments also contain fat and powdered cheese in the filler portion. The casing contains potato flakes and pregelatinized rice flour and retains its structural integrity and does not slip on heating. In preferred embodiments, potato flakes and pregelatinized rice flour comprise from about 10% to about 30% by weight of the starch component in the casing portion.

20 Claims, No Drawings

CHEESE-FILLED SNACK

TECHNICAL FIELD

This invention relates to cheese-filled snack products that can be baked or microwaved.

Center-filled food products are available in many varieties and are popular food items. Preferred filled snack products have a crisp baked outer dough shell, and a soft, lubricious filling. The dual texture of the product provides a pleasant eating experience. For some products such as cheese-filled snacks, the texture differential, flavor and aroma can be enhanced by heating the product.

The eating quality of cheese-filled snack products is superior when the interior is moist, but many products currently marketed contain low moisture levels so as to be shelf stable for extended periods without becoming soggy and having the cheese migrate into the shell or casing. Good shelf storage is thus achieved at the sacrifice of product taste and flavor quality. The products have a tendency to dry out further or leak out when heated. In addition, heating cheese-filled products having a casing made from conventional flour causes overexpansion and sometimes rupture or bursting of the snack.

It would be desirable to have a cheese-filled snack product that did not dry out, leak, overexpand or break when heated.

BACKGROUND ART

A number of publications describe the production of filled food products. Many describe machinery employed for the production of the dual textures, which is generally accomplished by coextrusion or by formation of the shell or casing followed by filling. Many others describe special formulations to keep the filling from migrating and the product from getting soggy.

U.S. Pat. No. 3,492,127 to Ketch and Barton, for example, suggested that the filling of a filled pastry be dehydrated to an overall moisture content of less than 6%, more commonly less than 4%, and preferably less than about 2%, and then rehydrated prior to baking. Cheese such as cottage cheese and other types in a dessicated form were disclosed as possible fillers, but the patent was chiefly directed to the preparation of shelf-stable pies filled with freeze-dried, vacuum-dried or air-dried fruit pieces. Rehydration was accomplished by adding an aqueous fluid through the upper crust. The method was, therefore, chiefly useful for large products contained in a dish or pie plate, rather than for snacks.

In U.S. Pat. No. 4,612,198, Wallin, et al., disclosed a filled pastry that contained a fairly high moisture filling yet retained structural integrity on toasting. The pastry was formulated by carefully controlling filling and casing viscosity and pH, and preparing a laminated dough pad that was stable at the filling interface. The pH and viscosity ranges were critical, which complicated the process. Also the patent was directed to the production of toaster breakfast pastries such as those filled with fruit or jellies which have product instability primarily caused by acid and water migration from the filling into the dough, limiting the applicability of the invention to other product types.

Both Ward, et al., U.S. Pat. No. 4,613,509, and Wainwright, U.S. Pat. No. 4,618,499, disclosed slitted center-filled food products. The former patent disclosed a process for producing center-filled food products by forming a hollow cylindrical edible shell having a single continuous longitudinal slit, through which was inserted a filling that had to be substantially stationary at product storage temperatures. The latter disclosed the cooking and extrusion of a casing, which was then slit open for filling insertion. The processes were suggested to avoid various problems encountered in filling brittle shells or in coextruding product components that exhibit very different heating and cooling characteristics, but the slits left in the finished products would provide vents that could leak if the final products were heated.

In U.S. Pat. No. 4,661,360, Smith disclosed peanut butter-filled snack products formed by coating the filling with a hydrophilic material and then surrounding the coated filling with a layer of dough. The snack was baked after the layers were applied to the filling, but the patent did not report about product performance on reheating.

Barry, et al., in U.S. Pat. No. 4,919,947, disclosed fillings that were formulated to control the crystal structure of the shortening and the particle size of the flavoring so they could be pumped into outer shells of cooked dough without clogging the nozzle. The patent addressed the structuring of fillings so that they were pumpable prior to final formulation of the product, and not the reheating of filled products.

It would be desirable to have a formulation specifically directed to a savory cheese-filled snack that can be baked or microwaved.

DISCLOSURE OF THE INVENTION

It is an object of the invention to provide a flavorful cheese-filled snack product.

It is a further and more specific object of the invention to provide a cheese-filled snack product which has an organoleptically pleasing, moist filling both at room temperature and after heating and which can be baked or microwaved without overexpanding or leaking.

These and other objects are accomplished by the present invention which describes a cheese-filled snack product containing pregelatinized rice flour in the filling and in the casing. The snack product filling comprises cheese and pregelatinized rice flour. Typically, it also contains fat, and, in many embodiments, at least a portion of the cheese is powdered. The snack product casing comprises potato flakes and pregelatinized rice flour. The casing typically also contains a fat ingredient and conventional flour.

In preferred embodiments, the potato flakes and pregelatinized rice flour comprise from about 10% to about 30%, more narrowly from about 15% to about 25%, by weight of the starch component in the casing portion. In some embodiments, the casing portion comprises about equal amounts by weight of potato flakes and pregelatinized rice flour. In one embodiment, the potato flakes and pregelatinized rice flour comprise about 22% by weight of the starch component in the casing portion.

In preferred embodiments, the pregelatinized rice flour comprises from about 5% to about 20%, more narrowly from about 8% to about 16%, by weight of the filler portion. The filler may contain one or more cheeses such as American cheese, Parmesan cheese, cheddar cheese, Swiss cheese, and the like, and can also contains spices and/or seasonings.

Methods for maintaining the structural integrity of a cheese-filled snack product and providing a creamy filling when the product is heated are also disclosed.

BEST MODES FOR CARRYING OUT THE INVENTION

This invention is based upon the finding that including pregelatinized rice flour in both the filler portion and the casing portion of a cheese-filled snack formulation results in a product that can be heated in a convection or microwave oven without having the cheese filling dry or leak out, or the casing overexpand and break.

A "cheese-filled snack" includes any baked or unbaked food product having a cheese filling portion and a casing or shell portion. As used herein, the term "casing" is not limited, so that the casing or shell portion can enclose all or part the filler portion. Thus, cheese-filled snacks include, but are not limited to, cheese-filled balls and barrels, open-ended and closed-ended cheese-filled logs, cheese toastettes, cheese-filled shells, cheese-filled pretzels, cheese-filled breadsticks, cheese-filled biscuits and the like. Low, intermediate, and high moisture cheese snack products are encompassed by this invention.

The casing portion is formulated to contain potato flakes and pregelatinized rice flour. These two starch ingredients preferably comprise from about 10% to about 30% by weight, more narrowly from about 15% to about 25% by weight, of the starch component in the casing portion, which typically also contains flour. In some embodiments, the casing portion comprises about equal amounts by weight of potato flakes and pregelatinized rice flour. In one embodiment, potato flakes and pregelatinized rice flour comprise about 22% by weight of the starch component in the casing portion.

By "pregelatinized rice flour" is meant any rice flour that has been gelatinized and then reprocessed by standard means, i.e., slurried in water, heated to gelatinization temperature to swell the starch granules, and then cooled and extruded and/or remilled as flour. As defined herein, the flour contains from about 11 to 13% by weight water; the weight percentages used must be adjusted for flours containing more or less moisture. An example pregelatinized rice product useful in the invention is marketed under the name Comet 2080 rice flour.

As used herein, the potato flakes contain from about 3 to 4% by weight moisture; weight percentages must be adjusted for flakes that contain more or less moisture. An example potato flake product useful in the invention is obtained from the Supreme Idaho Potato Company.

Any type of flour is typically used with the potato flakes and pregelatinized rice flour in the starch component of the casing portion. As used herein, flours contain from about 7 to about 9% by weight moisture; weight percentages must be adjusted for flours that contain more or less moisture. The flour can be all-purpose or unbleached wheat flour, potato, or other cereal flours such as corn, oats, rye, and mixtures thereof. The casing formulation also typically contains salt, a fat ingredient such as a shortening, butter, lard, vegetable oil, or fat mimetic, and an aqueous component of water, milk, fruit juice or other liquid, which, if baked, evaporates to some extent.

The casings may, optionally, contain other ingredients familiar to the skilled artisan such as leavening agents, cheese solids, browning agents, emulsifiers, plasticizers, spices, flavorings, antioxidants, and, in some embodiments, mold, bacteria, and yeast inhibitors. Example leavening agents include yeast, sodium or potassium bicarbonate, and the like. Browning agents include, for example, milk solids, corn sugar solids, or dihydroxyacetone that promote a golden brown color; these can be added up to about 12% by weight of the unbaked casing composition in some embodiments. Emulsifiers include, but are not limited to, mono- and diglycerides of fatty acids, sucrose partially fatty acid esters, sorbitan esters of fatty acids, polyoxyethylene sobitan esters of fatty acids, and the like. Plasticizers include, for example, propylene glycol, glycerine, sorbitol, dextrose, levulose, maltose, and corn syrup solids; these are usually present in small amounts (e.g., 0–3% by weight of the uncooked dough composition). Mold and yeast inhibitors, include, for example, sodium benzoate, benzoic acid, calcium propionate, sodium propionate, sorbic acid, potassium sorbate, calcium sorbate, diethylpyrocarbonate, and salts and esters of monohydroxybenzoic acid, added in small quantities (e.g., 0 to 0.3% by weight of the uncooked dough). Antioxidants such as, for example, butylated hydroxyanisole, tertiarybutylquinone, and citric acid typically are not required, but these may be included in some instances. Example formulations are given hereinafter.

The casing dough can be prepared by standard techniques for preparing snack and cracker doughs. Typically, the dry ingredients are mixed together. The shortening and emulsifiers are co-melted and then mixed with the dry ingredients, and then the liquid ingredients are added.

The filler portion of the snack products of this invention contains cheese and pregelatinized rice flour. The pregelatinized rice flour comprises from about 5% to about 20% by weight, more narrowly from about 8% to about 16% by weight, of the filler portion.

Any type of cheese may be employed, including high- or low-fat, unripened or ripened soft, semisoft, hard, very hard, processed, or whey cheeses. Legion cheese varieties are available and useful in the invention, including, but not limited to, American cheese, Parmesan cheese, Cheddar cheese, Swiss cheese and the like. Cheese blends may also be employed, and are preferred in some embodiments. In many embodiments, at least a portion of the cheese is powdered. As used herein, powdered cheese includes specialty powdered cheeses such as, for example, nacho-, pizza- and barbecue-flavored cheeses. Example formulations are given herein-after.

Many filler embodiments contain flavorings in addition to the flavor provided by the cheese or cheeses. Flavoring materials which can be incorporated into the filling compositions of this invention include, but are not limited to, spices, including onion, garlic and barbecue; meat flavorings, especially those that are commonly consumed with cheese such as pepperoni, salami, and pastrami; peanut butter and other nut flavorings; savory flavorings; dairy flavorings such as buttermilk and yogurt; and the like.

Many filler portion embodiments also contain a fat ingredient such as shortening, butter, lard, vegetable oil, or a fat mimetic. Hard filler fats are preferred in some embodiments. Processed fat solids comprise at least a portion of the fat ingredient in some embodiments. The filler portion can also contain aqueous ingredients such as water or milk, and other starch ingredients in addition to the pregelatinized rice flour component, such as all-purpose flour or potato flakes. The filler portion can also contain emulsifiers, antioxidants, and the like typical filler ingredients such as those mentioned for the casing component above. Example formulations are given hereinafter.

The cheese and other ingredients are thoroughly blended together to form the filler portion. In some embodiments, one or more cheeses, and, if used, solid fats, are melted prior to mixing to aid the blending process.

The snack products are manufactured using any means that partially or fully encloses the filler portion with the casing portion. This is accomplished either by forming a raw snack that can be cooked, e.g., baked, roasted or fried, before or after sale, or by preparing casing shells that can be filled after being cooked. In preferred embodiments, a raw snack comprising cheese filler and uncooked casing dough is prepared and then baked or roasted. In one embodiment, for example, the filler is placed on the casing dough and then the dough is sealed together to form a raw snack. In another embodiment, the filler is placed on a casing dough layer and a second layer of dough compressed around the filling and sealed against the first layer. In yet another embodiment, the two portions are coextruded.

Once the coated filling is enclosed or partially enclosed within the dough, the raw snack formed is then baked or roasted to form the finished baked filled snack product. Typically, the filled snack product is baked at a temperature of from about 350° to about 500° F. (117° to 260° C.) for from about 2 to 12 minutes. The particular baking conditions employed depend upon the size of the filled-snack product, the nature of the cheese in the filling, the amount of doneness required, and the like. Baking can be followed by a drying step at reduced temperature to achieve a desired water activity for the baked snack product. The water activity level of the finished product typically varies between 0.67 and 0.70.

The cheese-filled snack products of this invention exhibit a number of desirable characteristics. The dual texture is crisp on the outside and creamy on the inside, providing high flavor impact and pleasant eating quality. The filler has a smooth, uniform consistency that is moist both at room temperature and after heating, providing a good mouthfeel over a range of temperatures.

The cheese-filled products of the invention can be heated in conventional or microwave ovens without expanding, bursting, leaking, becoming soggy, drying out, or breaking apart. The casing does not slip off the filler during heating. The structural integrity is maintained over a wide temperature range so that the product can be easily handled. Flavor is retained on heating, and the oils do not migrate.

EXAMPLES

The following examples are presented to further illustrate and explain the present invention and should not be taken as limiting in any regard. Unless otherwise indicated, all parts and percentages are by weight, and are based on the weight at the particular stage of the processing being described. The flours used herein contain from about 11 to about 13% by weight moisture. Water activity is equal to the vapor pressure of a product divided by the vapor pressure of pure water under the same conditions. Moisture is measured using Brabender TM, and is expressed in units of % Salt is measured using Dicormate TM, and is expressed in units of %.

Example 1

To make a cheese filler of this invention, thoroughly combine the following ingredients for batches that can be small (grams) or large (lb., oz.):

| Ingredient | grams | or | lb., | oz. |
|---|---|---|---|---|
| Powdered White Cheddar Cheese | 500.0 | | 25 | 0 |
| Cheddar Cheese (EMC) | 30.0 | | 1 | 8 |
| Parmesan Cheese (EMC) | 30.0 | | 1 | 8 |
| Malt | 10.0 | | 0 | 8 |
| Salt | 6.0 | | 0 | 4 |
| Soybean Oil #2 | 50.0 | | 2 | 8 |
| Water | 100.0 | | 5 | 0 |
| Potato Flakes | 100.0 | | 5 | 0 |
| Staley Co. Pregelatinized Rice Flour | 100.0 | | 5 | 0 |

Example 2

To make a non-slip casing for cheese-filled log snacks according to the invention, first combine the following dry ingredients for small (grams) or large (lb., oz.) batches:

| Ingredient | grams | or | lb., oz. |
|---|---|---|---|
| All-Purpose Flour | 484.4 | | 70 0 |
| Staley Co. Rice Starch | 70.0 | | 10 0 |
| Potato Flakes | 70.0 | | 10 0 |
| Soda | 5.2 | | 0 12 |
| Sodium Acid Pyrophosphate | 5.2 | | 0 12 |
| Ammonia | 14.0 | | 2 0 |

Then combine the following ingredients

| Ingredient | grams | or | lb., oz. |
|---|---|---|---|
| Soybean Oil #2 | 40.0 | | 5 11 |
| Lecithin | 1.3 | | 0 3 |
| Sugar | 40.0 | | 0 11 |
| Salt | 5.2 | | 0 12 |
| Sodium 2-Stearoyl Lactylate | 3.5 | | 0 8 |
| Water | 225.0 | | 32 0 |

Add to the dry ingredients and process in the usual manner.

Example 3

To make a pizza cheese filler of the invention, thoroughly combine:

| Ingredient | grams |
|---|---|
| Kraft Sequoia Yellow (722) Powdered Cheese | 500.0 |
| Pregelatinized Rice Flour | 100.0 |
| Quest AA91101 Pizza Flavor | 60.0 |
| Parmesan Cheese (EMC) | 30.0 |
| Cheddar Cheese (EMC) | 30.0 |
| Soybean Oil #2 | 50.0 |
| Malt | 10.0 |
| Onion Powder | 10.0 |
| Sodium 2-Stearoyl Lactylate | 3.5 |
| Annato Color #4 | 1.0 |
| Dried Oregano Flakes | 1.0 |
| Dried Parsley Flakes | 1.0 |
| Water | 125.0 |

Snack cheese logs are prepared using this filling and the casing of Example 2, except that no ammonia is employed. After baking, the products exhibit the following parameters:
water activity level 0.61 moisture 4.6
salt 1.8
pH 5.9

Example 4

Other pizza cheese logs are prepared in small (grams) or large (lb., oz.) batches.

For the cheese filling, thoroughly combine

| Ingredient | grams | or | lb., oz. |
|---|---|---|---|
| Kraft American #21 Cheese | 250.0 | | 25 0 |
| Pregelatinized Rice Flour | 100.0 | | 10 0 |
| Quest AA91101 Pizza Flavor | 30.0 | | 3 0 |
| Parmesan Cheese (EMC) | 15.0 | | 1 8 |
| Cheddar Cheese (EMC) | 15.0 | | 1 8 |
| Onion Powder | 5.0 | | 1 0 |
| Garlic Powder | 5.0 | | 0 8 |
| Dried Oregano Flakes | 1.0 | | 0 1.6 |
| and Parsley Flakes with | 1.0 | | 0 1.6 |
| Hard Filler Fat (Centory Soya ™) | 200.0 | | 20 0 |
| Annato Color #4 | 1.5 | | 0 3.5 |

The casing of Example 2, without ammonia, is employed to make snack cheese logs that do not break during preparation. The snack logs are put in plastic and microwaved at a medium setting for 30 seconds. The hot snacks retain their structural integrity, and the cheese filling does not leak out, exhibiting a moist texture that is not dry. After 10 days, the snacks are placed in plastic and then microwaved at a medium setting for 20 seconds; once again, the snacks maintain their structural integrity, and the cheese does not leak out or harden.

Similar results are obtained on heating the logs in a toaster: the snack products retain their shape, and the cheese filling stays moist and does not leak out.

Example 5

Another cheese filling of this invention is prepared by thoroughly combining

| Ingredient | grams | or | lb., oz. |
|---|---|---|---|
| Kraft American #21 Cheese Powder | 500.0 | | 25 0 |
| Cheddar Cheese (EMC) | 7.5 | | 0 6 |
| Pregelatinized Rice Flour | 100.0 | | 5 0 |
| Malt | 10.0 | | 0 8 |
| Onion Powder | 10.0 | | 0 8 |
| Soybean Oil | 50.0 | | 2 8 |
| Sodium 2-Stearoyl Lactylate | 5.0 | | 0 4 |
| Water | 100.0 | | 5 0 |

Another cheese filling is prepared by combining

| Ingredient | grams | or | lb., oz. |
|---|---|---|---|
| Kraft American #21 Cheese Powder | 250.0 | | 25 0 |
| Hard Filler Fat (Centory Soya ™) | 150.0 | | 15 0 |
| Pregelatinized Rice Flour | 100.0 | | 10 0 |
| Malt | 10.0 | | 0 8 |
| Onion Powder | 10.0 | | 0 8 |
| Soybean Oil | 50.0 | | 2 8 |
| Sodium 2-Stearoyl Lactylate | 5.0 | | 0 4 |
| Water | 100.0 | | 5 0 |

Snack cheese logs are prepared using the second filling and the casing of Example 2, except that no ammonia is employed. After baking, the products exhibit the following parameters:

water activity level 0.67
moisture 2.88
salt 1.3
pH 6.2

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the claims that follow. The claims are meant to cover the claimed components and steps in any sequence which is effective to meet the objectives there intended, unless the context specifically indicates the contrary.

I claim:

1. A filled snack product comprising:
   (a) a filler portion comprising cheese and pregelatinized rice flour; and
   (b) a casing portion comprising potato flakes and pregelatinized rice flour.

2. A product according to claim 1 wherein at least a portion of the cheese in the filler portion is powdered cheese.

3. A product according to claim 1 wherein the casing portion further comprises flour.

4. A product according to claim 1 wherein the filler portion further comprises fat.

5. A product according to claim 4 wherein the fat comprises processed fat solids.

6. A product according to claim 1 wherein the cheese is selected from the group consisting of American cheese, Parmesan cheese, cheddar cheese, Swiss cheese, and mixtures thereof.

7. A cheese-filled snack product comprising a filler portion comprising cheese, fat and pregelatinized rice flour, and a casing portion comprising flour, potato flakes and pregelatinized rice flour.

8. A product according to claim 7 wherein the potato flakes and pregelatinized rice flour comprise from about 10% to about 30% by weight of the starch component in the casing portion.

9. A product according to claim 8 wherein the potato flakes and pregelatinized rice flour comprise from about 15% to about 25% by weight of the starch component in the casing portion.

10. A product according to claim 9 wherein the potato flakes and pregelatinized rice flour comprise about 22% by weight of the starch component in the casing portion.

11. A product according to claim 7 wherein the casing portion comprises about equal amounts by weight of potato flakes and pregelatinized rice flour.

12. A product according to claim 7 wherein the pregelatinized rice flour comprises from about 5% to about 20% by weight of the filler portion.

13. A product according to claim 11 wherein the pregelatinized rice flour comprises from about 8% to about 16% by weight of the filler portion.

14. A pizza-flavored cheese-filled product according to claim 7.

15. A product according to claim 7 comprising American cheese.

16. A product according to claim 7 which exhibits a water activity level of about 0.67 to 0.70.

17. A method for maintaining the structural integrity of a cheese-filled snack product and providing a creamy filling when the product is heated comprising incorporating pregelatinized rice flour in the filler portion of the product and pregelatinized rice flour and potato flakes in the casing portion of the product.

18. A method according to claim 17 wherein the rice flour and the potato flakes comprise from about 10% to about 30% by weight of the starch component of the casing portion, and about equal parts rice flour and potato flakes are incorporated in the casing portion.

19. A method according to claim 17 wherein the pregelatinized rice flour comprises from about 5 to about 20% by weight of the cheese filling portion.

20. A cheese log product prepared according to the method of claim 17.

* * * * *